United States Patent
Lucas

[11] 3,882,593
[45] May 13, 1975

[54] METHOD OF INERTIA WELDING

[75] Inventor: Stanley B. Lucas, Shreveport, La.

[73] Assignees: E. Mickey Hubbard, Dallas, Tex.; Wilkinson, Woods, Carmody, Meadows & Hall, Shreveport, La.; part interest to each

[22] Filed: Aug. 28, 1969

[21] Appl. No.: 853,840

[52] U.S. Cl. .................... 228/113; 228/2; 156/73
[51] Int. Cl. ............................................ B23k 19/00
[58] Field of Search ........... 228/2; 29/470.3; 156/73

[56] References Cited
UNITED STATES PATENTS

| | | | |
|---|---|---|---|
| 463,134 | 11/1891 | Bevington | 29/470.3 |
| 3,002,871 | 10/1961 | Tramm et al. | 156/73 |
| 3,234,644 | 2/1966 | Hollander | 29/470.3 |
| 3,235,160 | 2/1966 | Walton | 228/2 |
| 3,235,162 | 2/1966 | Hollander | 29/470.3 |
| 3,462,826 | 8/1969 | Farmer et al. | 29/470.3 |

Primary Examiner—Francis S. Husar
Assistant Examiner—Gus T. Hampilos
Attorney, Agent, or Firm—Hubbard, Thurman, Turner & Tucker

[57] ABSTRACT

A method of inertia welding wherein a pair of relatively rotatable workpieces are axially engaged under pressure at a common interface with one of the workpieces then being associated for rotation with a rotatable inertia mass or flywheel for transfer of rotational energy from the flywheel to the workpieces to accomplish a bond at their interface and the one workpiece then being dissociated from rotation with the flywheel.

8 Claims, 1 Drawing Figure

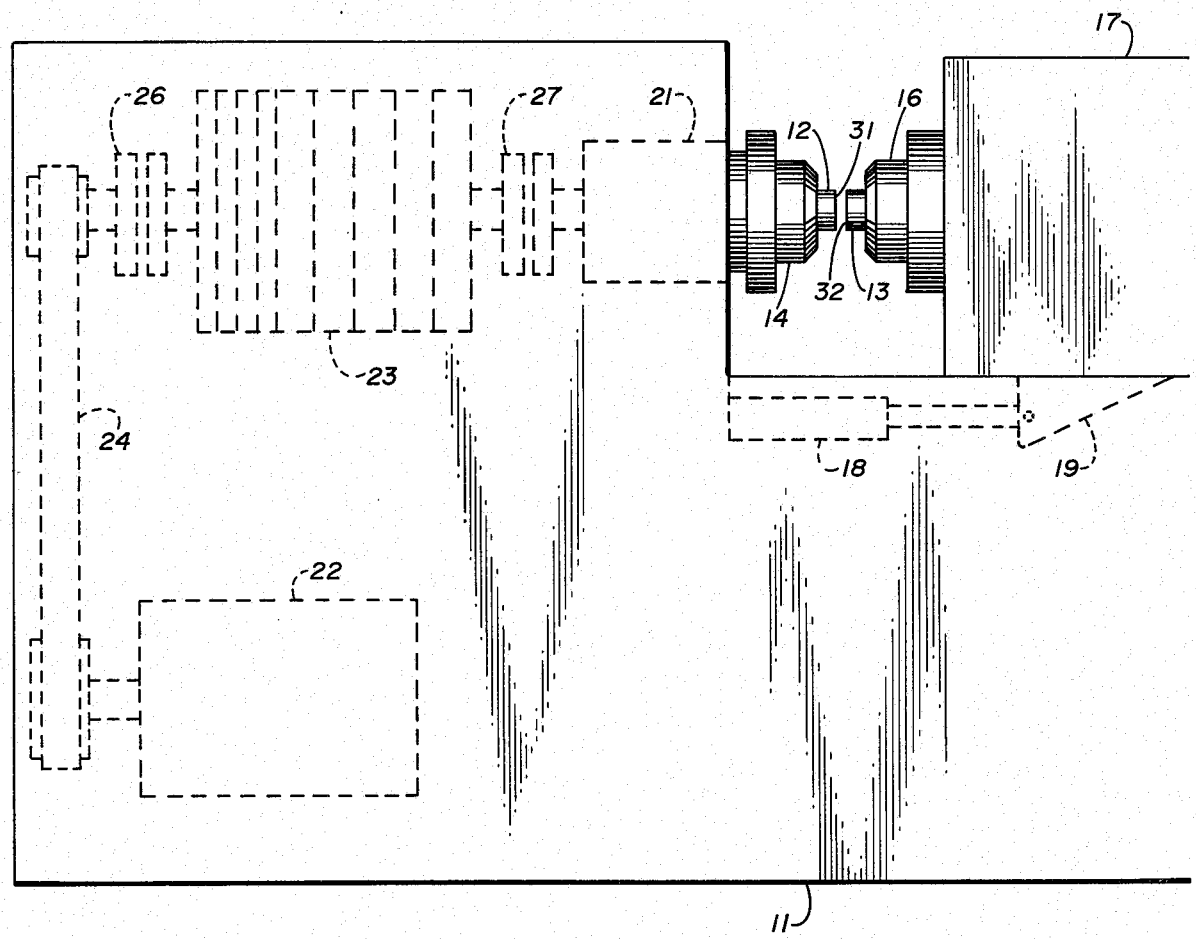

METHOD OF INERTIA WELDING

The present invention relates to a method of inertia welding for bonding two relatively rotatable workpieces at a common interface and more particularly to such a method wherein the two workpieces are axially engaged under pressure at their interface before rotational energy is transferred to the workpieces from a suitable rotatable mass such as a flywheel. Preferably, excess inertial energy is stored in the flywheel relative to the requirements for bonding the two workpieces so that when the flywheel is dissociated from the workpieces, the excess energy remains in the flywheel.

Employing the present method for accomplishing a weld cycle permits the flywheel to be accelerated to a preselected rotational speed while the workpieces are being inserted within suitable chucking means. The storage of excess energy within the flywheel permits the flywheel to continue in rotation even after it is uncoupled from the workpieces, thereby permitting the flywheel to be more readily accelerated to its preselected speed for a subsequent weld cycle.

In the prior art, the flywheel is accelerated to a predetermined speed and then coupled to a spindle securing one of the relatively rotatable workpieces. The workpieces are then axially engaged while the one workpiece is rotating together with the flywheel.

It is immediately apparent that within the prior art method of inertia welding, it is generally necessary to accelerate the flywheel from a stationary condition after the workpieces have been suitably secured within the welding machine. It is also believed to be apparent that the method of inertia welding taught by the present invention offers numerous advantages over the prior art. For example, production welding efficiency may be substantially increased through shortening of the duration of each weld cycle. In addition, the present method tends to retain other desirable characteristics of more conventional inertia welding techniques including a narrow heat affected zone created at the interface of the workpieces, consistent reproducibility of weld quality, and the capability of handling a large variety of workpiece materials and sizes. A further advantage of the present method, made more apparent by the following description, is the capability of accomplishing a complete weld cycle without the need for an energy consuming braking system.

Other advantages of the present invention are also made apparent from the following description of the present welding method which is described having reference to a typical welding machine of which a side elevation view is set forth in the accompanying drawing.

An inertia welding machine of the type illustrated in the drawing includes a housing or frame structure 11 which supports the various components of the welding machine. A pair of workpieces 12 and 13 are supported in axially aligned assemblies 14 and 16. The chuck 16 is secured against rotation upon a tailstock fixture 17 which is slidably mounted upon the framework 11. The tailstock assembly 17 and the chuck 16 are moved toward and away from the chuck 14 by means of a hydraulic loading cylinder 18 which is mounted between the framework 11 and a bracket 19 affixed to a tailstock assembly 17. The workpieces 12 and 13 may be brought into axial engagement under pressure, for example, during a welding cycle by retraction of the cylinder 18. The tailstock assembly 17 may again be moved away from the chuck 14, for example, to mount new workpieces in the chucks 14 and 16, by extending the hydraulic cylinder 18.

The chuck 14 supporting the workpiece 12 is secured for rotation upon a spindle 21. Energy for rotating the spindle 21, spindle chuck assembly 14, and the one workpiece 12 is provided by a motor generally indicated at 22. The motor 22 is connected with a variable inertia mass or interchangeable flywheel assembly 23 by means of a drive unit or belt 24 and a flywheel clutch 26. The flywheel assembly 23 is also selectively connected for rotational drive of the spindle 21 by means of a spindle clutch 27 arranged between the flywheel assembly and spindle.

A welding cycle may be accomplished according to the present invention with the welding machine illustrated in FIG. 1 in the following manner. The weld pieces 12 and 13 are respectively secured in axially aligned and relatively rotatable relation within the chuck assemblies 14 and 16. The loading cylinder 18 is then actuated to move the tailstock assembly 17 toward the spindle 21 until the workpieces 12, 13 are brought into axial engagement under pressure at an interface formed by their adjacent end surfaces indicated respectively at 31 and 32. The force with which the workpieces are engaged as well as other parameters of the welding cycle such as rotational speed and mass of the flywheel 23, may be selected according to techniques well known in the inertia welding art based upon the material composition and size of the workpieces 12 and 13. The axial force with which the workpieces are engaged as described above, is sufficient to permit bonding to the workpieces during a weld cycle and is maintained until the bond is completed.

Either before or after axial engagement of the workpieces 12 and 13, the flywheel assembly 23 is accelerated to its preselected rotational speed by the motor 22 with the clutch 26 being engaged and the spindle clutch 27 being disengaged. With the flywheel assembly 23 rotating at its preselected speed, the flywheel clutch 26 is then disengaged and the spindle clutch 27 is engaged to couple the spindle 21, the spindle chuck 14 and the workpiece 12 for rotation with the flywheel assembly 23. The flywheel assembly 23 then rapidly accelerates the spindle 21 and delivers rotational energy to the workpiece 12 which is converted to heat by means of friction at the interface of the relatively rotating workpieces. The preselected rotational speed and mass of the flywheel assembly 23 is at least sufficient to raise the temperature at the interface of the workpieces to a temperature suitable for bonding.

In a preferred manner of operation, the mass and preselected rotational speed of the flywheel assembly 23 produce an excessive amount of rotational energy relative to the amount of energy required to accomplish a satisfactory bond between the workpieces 12 and 13. The clutch 27 is then engaged in the manner described above to accelerate the spindle 21 and workpiece 12 in order to initiate bonding between the two workpieces as described above. When the combination of the flywheel assembly 23, spindle 21, chuck assembly 14 and workpiece 12 decelerate to a preselected rotational speed, the clutch 27 is again disengaged to release the spindle 21 from rotation with the flywheel assembly 23. The preselected disengaging speed referred above occurs when the optimum amount of rotational energy has been transferred form the flywheel assembly 23 to the spindle 21, chucking assembly 14 and workpiece 12 for accomplishing a suitable bond between the workpieces. The excess of energy stored within the flywheel assembly 23 remains after disengagement of the clutch 27 so that the flywheel assembly 23 does not come to a complete stop. Thus, the flywheel assembly 23 may be again accelerated by engagement of the clutch 26 and operation of the motor 22 to a preselected speed for commencing a new weld cycle in less time and with a smaller requirement of acceleration energy.

After disengagement of the clutch 27, the spindle 21, chuck assembly 14 and workpiece 12 decelerate to zero so that the optimum amount of rotational energy referred above is generally consumed completely at the interface of the workpieces in order to accomplish a suitable bond.

When the bond or weld is completed at the interface of the weld pieces 12, 13, one of the chucks 14, 16 is loosened and the loading cylinder 18 is extended to move the tailstock assembly 17 away from the spindle chuck 14. The other chuck may then be loosened and the bonded workpieces removed from the machine.

Within the present method of operation, the motor 22 may be operated to accelerate the flywheel assembly 23 to its preselected rotational speed even while the bonded workpieces are being removed from the chucks. Thus, a new pair of workpieces may be inserted and secured within the chuck assemblies 14, 16 and brought into axial engagement under pressure by the load cylinder 18 so that a subsequent weld cycle may be immediately commenced.

It is apparent that numerous variations of the above weld cycle are possible within the scope of the present invention as defined by the following claims. For example, it may be desired to leave the clutch 26 engaged during the entire weld cycle. In this manner, the flywheel assembly 23 may immediately accelerate it to its preselected rotational speed for commencing a new cycle as soon as the clutch 27 is disengaged.

Although a preferred embodiment of the invention has been described in detail, it is to be understood that various changes, substitutions, and alterations can be made therein without departing from the spirit and scope of the invention as defined by the appended claims.

What is claimed is:

1. In a method of bonding two relatively rotatable workpieces, of the type wherein the workpieces are axially engaged at a common interface with sufficient force to permit friction bonding of the workpieces at their interface and wherein one of the workpieces is associated for rotation with a rotatable inertia mass and rotational energy is transferred from the rotatable mass to the one workpiece in sufficient quantity and at suitable rotational speed of the one workpiece relative to the other workpiece to effectively bond the axially engaged workpieces at their interface, the improvement comprising the sequence of applying the total axial load required to bond the workpieces prior to initiating any relative rotation between the workpieces and then driving the workpieces in relative rotation totally by the rotatable inertia mass to produce the transfer of the rotational energy.

2. The invention of claim 1 further comprising the steps of developing excess inertial energy in the rotatable inertia mass relative to the bonding requirements for the two workpieces and dissociating the one workpiece from rotation with the rotatable inertia mass following said transferring of rotational energy from the rotatable inertia mass to the one work piece with the excess of inertial energy remaining in the rotatable inertia mass.

3. The invention of claim 1 wherein the step of a associating the rotatable inertia mass with the one workpiece is accomplished by coupling means arranged therebetween.

4. The invention of claim 1 wherein the rotatable inertia mass is first accelerated to a preselected speed by suitable motor means and then coupled for rotation with the one workpiece.

5. The invention of claim 4 wherein the preselected speed produces excess inertial energy in the rotatable inertia mass relative to the bonding requirements for the two workpieces and the rotatable inertia mass is uncoupled from the one workpiece with the excess of inertial energy remaining in the rotatable inertia mass.

6. The invention of claim 4 wherein the rotatable inertia mass is coupled to the motor means for acceleration of the rotatable inertia mass to the preselected speed and then uncoupled from the motor means generally at the same time that rotatable inertia mass is coupled with the one workpiece.

7. In a method of bonding two workpieces, the steps comprising:
   securing the two workpieces in axially aligned, relatively rotatable relation,
   axially urging the workpieces into engagement at a common interface under the total pressure required to bond the workpieces at said common interface,
   connecting one of the workpieces for rotation with a rotating inertial mass, and
   disconnecting the one workpiece and rotating inertia mass upon delivery of sufficient rotational energy to the relatively rotatable workpieces to bond them together at their interface.

8. The method of claim 7 further comprising the steps of accelerating the rotatable inertia mass by motor means to a preselected speed producing excess inertial energy in the rotatable inertia mass relative to the bonding requirements for the two workpieces prior to connection of the one workpiece for rotation with the rotatable inertia mass and disconnecting the one workpiece from the rotating inertia mass with the excess of inertial energy remaining in the rotatable inertia mass.

* * * * *